(12) United States Patent
Taniguchi

(10) Patent No.: US 11,568,719 B2
(45) Date of Patent: Jan. 31, 2023

(54) DEVICE, METHOD, AND RECORDING MEDIUM

(71) Applicant: Yokogawa Electric Corporation, Tokyo (JP)

(72) Inventor: Koichi Taniguchi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 31 days.

(21) Appl. No.: 16/525,624

(22) Filed: Jul. 30, 2019

(65) Prior Publication Data

US 2020/0043306 A1 Feb. 6, 2020

(30) Foreign Application Priority Data

Jul. 31, 2018 (JP) .............................. JP2018-143995

(51) Int. Cl.
*G08B 23/00* (2006.01)
*G08B 7/06* (2006.01)

(52) U.S. Cl.
CPC ...................................... *G08B 7/06* (2013.01)

(58) Field of Classification Search
CPC ........................................................ G08B 7/06
See application file for complete search history.

(56) References Cited

U.S. PATENT DOCUMENTS 5,991,896 A * 11/1999 Cho .................... G05B 19/0428
714/55
6,954,180 B1 * 10/2005 Braun ..................... H01Q 1/36
343/702
8,655,548 B2 * 2/2014 Ichida .................... B62M 25/08
439/127
9,668,218 B2 * 5/2017 Okawa .................... H04W 4/40
9,800,958 B1 * 10/2017 Petri ........................ H04Q 9/00
(Continued)

FOREIGN PATENT DOCUMENTS

CN 202816213 U 3/2013
EP 2863283 A1 4/2015
(Continued)

OTHER PUBLICATIONS

Hassan et al., The Development of Smart Switch System for The Automation System in Power Utilities (Year: 2006).*
(Continued)

*Primary Examiner* — Quang Pham

(57) ABSTRACT

After an installation of an apparatus, although a state confirmation is necessary, if a display having a high display capability is mounted to the apparatus to facilitate checking, the apparatus becomes large. Further, although it is considered that a terminal such as a personal computer is connected to an apparatus to display state information, when the apparatus is installed in a high place or a narrow gap, the connection is difficult. An apparatus is provided which includes a storage unit that stores state information on a plurality of types of states, a switching unit that switches a to-be-output state from among the plurality of types of states in response to receiving a switching operation by a user, an identification information output unit that outputs a first indication for identifying a type of a to-be-output state, and a state information output unit that outputs state information on a to-be-output state.

13 Claims, 6 Drawing Sheets

(56) References Cited

U.S. PATENT DOCUMENTS

| | | | |
|---|---|---|---|
| 9,991,741 B1* | 6/2018 | Bell | H02J 7/00034 |
| 10,045,297 B1* | 8/2018 | Shmidt | H04W 52/0229 |
| 10,174,880 B2 | 1/2019 | Kawanaka | |
| 10,663,940 B2* | 5/2020 | Patrocinio Natunes Lopes | D05B 37/04 |
| 10,852,018 B1* | 12/2020 | Flora | G05B 15/02 |
| 11,005,900 B2* | 5/2021 | Choe | H04L 65/1059 |
| 11,284,351 B2* | 3/2022 | Kim | H04W 76/30 |
| 2004/0093150 A1* | 5/2004 | Arai | F01M 11/10 701/104 |
| 2005/0158018 A1* | 7/2005 | Sawada | H04N 9/8042 |
| 2005/0275674 A1* | 12/2005 | Hung | G06F 13/4291 347/14 |
| 2006/0128446 A1* | 6/2006 | Hirokawa | H04W 52/027 455/574 |
| 2008/0195066 A1* | 8/2008 | Speeg | A61B 10/0275 604/326 |
| 2009/0017908 A1* | 1/2009 | Miyamoto | A63F 13/10 463/31 |
| 2009/0131820 A1* | 5/2009 | Speeg | A61B 10/0266 600/566 |
| 2010/0257228 A1 | 10/2010 | Staggs | |
| 2011/0199709 A1* | 8/2011 | Ieda | F02D 41/1495 361/78 |
| 2011/0267191 A1* | 11/2011 | Slepov | H04L 49/40 340/540 |
| 2013/0326112 A1* | 12/2013 | Park | G06F 3/0679 711/102 |
| 2014/0032151 A1* | 1/2014 | Araki | G05B 19/4184 702/81 |
| 2014/0043090 A1* | 2/2014 | Xu | H03K 19/0016 327/387 |
| 2014/0300586 A1* | 10/2014 | Dowd | G06F 3/03545 345/179 |
| 2015/0077911 A1 | 3/2015 | Hsu | |
| 2016/0011578 A1* | 1/2016 | Tobori | G05B 23/0216 700/79 |
| 2016/0259501 A1* | 9/2016 | Nagarajan | G06F 9/451 |
| 2016/0267754 A1* | 9/2016 | Hickman | G01R 1/07 |
| 2017/0187828 A1* | 6/2017 | Soji | H04L 67/62 |
| 2017/0307245 A1* | 10/2017 | Itaya | G01M 99/008 |
| 2018/0039819 A1* | 2/2018 | Jiang | G06F 21/32 |
| 2018/0131898 A1* | 5/2018 | Guzik | H04N 9/8205 |
| 2018/0227080 A1* | 8/2018 | Stein | H04J 3/0673 |
| 2018/0283873 A1* | 10/2018 | Lu | G01C 22/006 |
| 2019/0004507 A1* | 1/2019 | Daitou | G06Q 50/06 |
| 2019/0068791 A1* | 2/2019 | Okamoto | H04Q 9/00 |
| 2019/0333078 A1* | 10/2019 | Bala | G06N 20/00 |

FOREIGN PATENT DOCUMENTS

| | | | | |
|---|---|---|---|---|
| JP | H096413 | * | 1/1997 | G05B 19/05 |
| JP | H096413 A | | 1/1997 | |
| JP | 2002074567 A | | 3/2002 | |
| JP | 2003296857 A | | 10/2003 | |
| JP | 2006085430 A | | 3/2006 | |
| JP | 2006331097 A | | 12/2006 | |
| JP | 2011215903 A | | 10/2011 | |
| JP | 2013037426 A | | 2/2013 | |
| JP | 2016105049 A | | 6/2016 | |

OTHER PUBLICATIONS

Lee et al., Developing an Active Mode of Network Management System with Intelligent Multi-Agent Techniques (Year: 2009).*

Lv et al., An Anomaly Detection Algorithm for the Power Industrial Terminal Security Monitoring (Year: 2019).*

Office Action issued for counterpart Japanese Application No. 2018-143995, drafted by the Japan Patent Office dated Aug. 22, 2019.

Office Action issued for counterpart Japanese Application No. 2018-143995, issued by the Japanese Patent Office dated Dec. 17, 2019 (drafted on Dec. 6, 2019).

Extended European Search Report for counterpart European Application No. 19189249.6, issued by the European Patent Office dated Dec. 18, 2019.

Office Action issued for counterpart Chinese Application 201910645897.6, issued by the China National Intellectual Property Administration dated Jul. 17, 2020.

* cited by examiner

| # | STATE | IDENTIFICATION INFORMATION (FIRST INDICATION) (OLD) → (NEW) | STATE INFORMATION (SECOND INDICATION) | |
|---|---|---|---|---|
| 0 | POWER SOURCE | ○○ ... REPEAT UNIT | ON ●●●● | OFF ○○○○ |
| 1 | BATTERY VOLTAGE | ●○○○ ... REPEAT UNIT | HIGH ●●●● | LOW ○○○○ |
| 2 | USB POWER | ○●○○○ ... REPEAT UNIT | ON ●●●● | OFF ○○○○ |
| 3 | OPERATION STATE | ●○●○○○ ... REPEAT UNIT | NORMAL ●●●● | ERROR ○○○○ |
| 4 | COMMUNICATION STATE | ○●○●○○○ ... REPEAT UNIT | INQUIRING ●○○○ / Cloud OK ●●●● / GW OK ●●●○ | NG ○○○○○ |
| 5 | RESERVED | ●○●○●○○○ ... REPEAT UNIT | 1 ●●●● | 0 ○○○○ |
| 6 | RESERVED | ○●○●○●○○○ ... REPEAT UNIT | 1 ●●●● | 0 ○○○○ |
| 7 | RESERVED | ●○●○●○●○○○ ... REPEAT UNIT | 1 ●●●● | 0 ○○○○ |

FIG. 3

DEVICE, METHOD, AND RECORDING MEDIUM

The contents of the following Japanese patent application(s) are incorporated herein by reference:
2018-143995 filed in JP on Jul. 31, 2018.

BACKGROUND

1. Technical Field

The present invention relates to an apparatus, a method, and a recording medium.

2. Related Art

In recent years, attentions are paid to Internet of things (IoT) and Industrial Internet of Things (IIoT) and the cloudization of a system in which a large number of apparatuses such as sensors are distributed and arranged to conduct measuring, monitoring and the like is in progress. For example, Patent Document 1 discloses a system and a method related to the use of the cloud computing in the industrial application.
Patent Document 1: Japanese Patent Application Publication No. 2012-523038

After installation of the apparatus, it is necessary to check the states of the operation at the site, if a display having a high display capability is mounted to the apparatus to facilitate the check, the apparatus becomes large in size. Further, although it may be considered that a terminal such as a personal computer is connected to the apparatus to display the state information, when the apparatus is installed at the high place or a narrow gap, the connection is difficult.

SUMMARY

To solve the above-mentioned problem, in the first aspect of the present invention, the apparatus is provided. The apparatus may include a storage unit that stores state information on a plurality of types of states. The apparatus may include a switching unit that switches a to-be-output state from among the plurality of types of states in response to receiving a switching operation by a user. The apparatus may include an identification information output unit that outputs a first indication for identifying a type of a to-be-output state. The apparatus may include a state information output unit that outputs state information on a to-be-output state.

The identification information output unit may include at least one first generation source that generates light, sound or vibration. The identification information output unit may include a first control unit that operates the first generation source in a pattern corresponding to the first indication. The identification information output unit may include the pin appearance device that outputs the first indication by only a pin arranged to correspond to the first indication protruding from among a plurality of pins arrayed in an appealable manner.

The state information output unit may include at least one second generation source that generates light, sound or vibration. The state information output unit may include a second control unit that operates the second generation source in a pattern corresponding to the second indication according to the state information on a to-be-output state. The at least one second generation source may be seven light sources for number display in the seven-segment display.

The at least one first generation source may be the light source for decimal point display in the seven-segment display.

The identification information output unit may include a single first generation source. The state information output unit may include a single second generation source. The first control unit may operate the first generation source in the time series pattern corresponding to the first indication. The second control unit may operate the second generation source in the time series pattern corresponding to the second indication. The first generation source and the second generation source may be a same generation source. The first control unit and the second control unit may operate the same generation source by differentiating an output period from each other. The identification information output unit may include a single first generation source. The state information output unit may include a single second generation source. The first control unit may operate the first generation source at a frequency corresponding to the first indication. The second control unit may operate the second generation source at a frequency corresponding to the second indication.

The state information output unit and the identification information output unit may end an output when an operation by a user is not received during a first predetermined reference duration.

The apparatus may further include a single switch that receives the operation by a user. The apparatus may further include the power supply unit that switches on or off a power supply in response to a fact that the switch receives an operation that continues for the second reference duration or more. The switching unit may switch a to-be-output state in response to a fact that the switch receives the switching operation of less than the second reference duration. The switch may include the tension switch, an optical switch whose state is switched when receiving light, a magnetic switch whose state is switched when a magnetic body is in a proximity, a capacitance switch whose state is switched when coming into contact with a human body, the vibration switch whose state is switched by a vibration, or the sound switch whose state is switched by an air vibration.

Each of a plurality of types of states may be either one of the state of the apparatus or the state of equipment connected to the apparatus.

The equipment may be an application module including at least one of a sensor, an actuator, an input port, an output port, an input/output port, and a user interface. The apparatus may be the interface module. The interface module may include the interface module side communication connector detachably connected to an application module side communication connector of the application module. The interface module may include the network interface connected to a network. The network interface may transmit contents of the output when the identification information output unit and the state information output unit conduct the output.

In the second aspect of the present invention, a method is provided. The method may include a storage stage in which state information on a plurality of types of states is stored. The method may include a switching stage in which a to-be-output state from among the plurality of types of states is switched in response to receiving a switching operation by a user. The method may include an identification information output stage in which a first indication for identifying a type of a to-be-output state is output. The method may include a state information output stage in which state information on a to-be-output state is output.

In a third aspect of the present invention, a recording medium storing a program is provided. The program may cause the computer to function as a storage unit that stores state information on a plurality of types of states. The program may cause the computer to function as a switching unit that switches a to-be-output state from among the plurality of types of states in response to receiving a switching operation by a user. The program may cause the computer to function as an identification information output unit that outputs a first indication for identifying a type of a to-be-output state. The program may cause the computer to function as a state information output unit that outputs state information on a to-be-output state.

The summary clause does not necessarily describe all necessary features of the embodiments of the present invention. The present invention may also be a sub-combination of the features described above.

BRIEF DESCRIPTION OF THE DRAWINGS

FIG. 3 illustrates output patterns of a first indication and a second indication.

DESCRIPTION OF EXEMPLARY EMBODIMENTS

Although the present invention is described below through embodiments of the invention, the embodiments below do not limit the scope of the claims of the invention. Further, not all of a combination of features described in the embodiments is essential to the solution of the invention.

1. System 1

Figure 1:
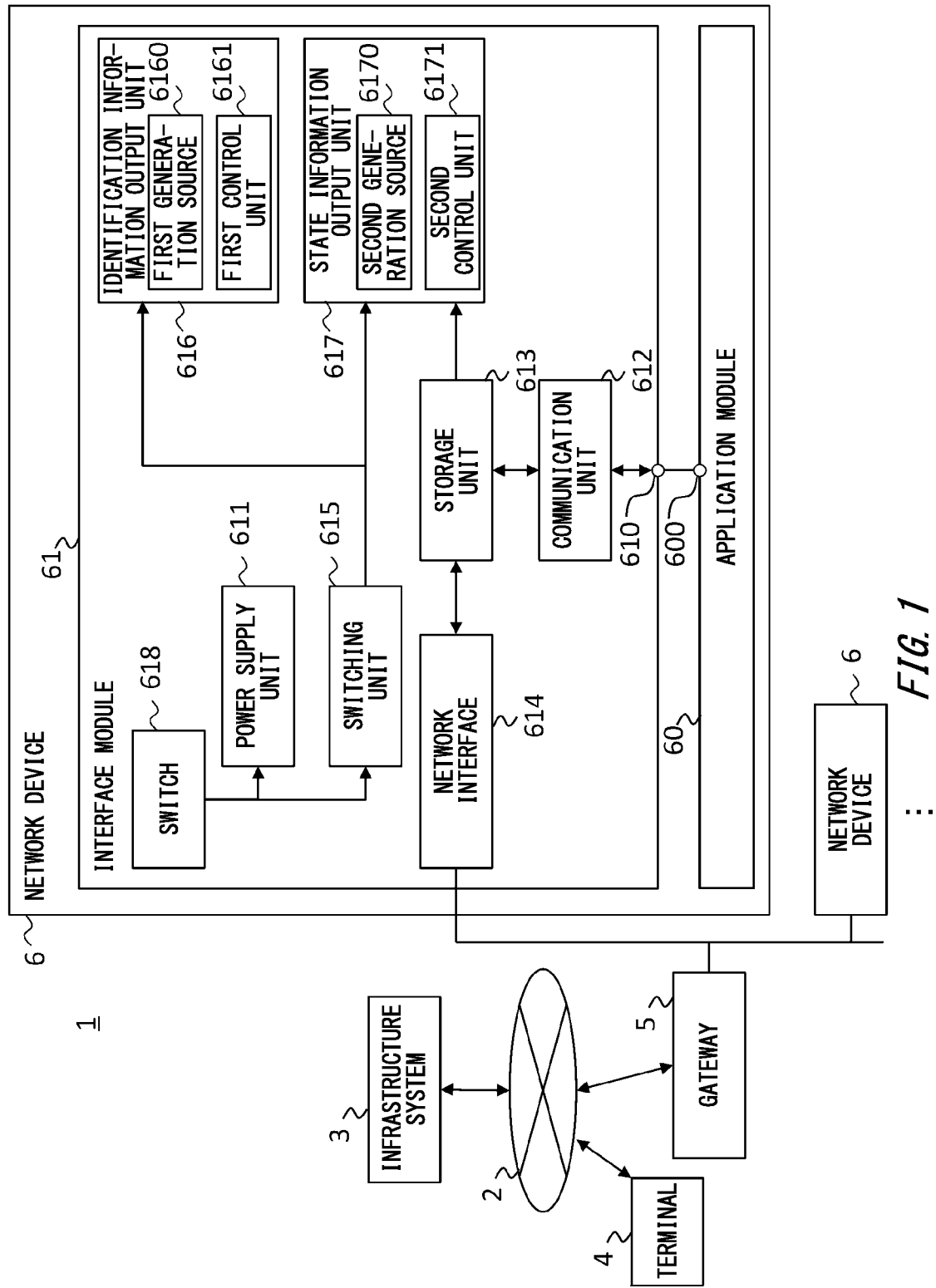
FIG. 1 illustrates a system 1 according to the present embodiment.

FIG. 1 illustrates a system 1 according to the present embodiment. The system 1 includes a network 2, an infrastructure system 3, a terminal 4, a gateway 5, and a plurality of network devices 6.

[1-1. Network 2]

The network 2 connects the infrastructure system 3, the terminal 4, and the network device 6 wirelessly or by wire. The network 2 may be the Internet, a wide area network, a local area networks or the like, and may include a mobile network.

[1-3. Infrastructure System 3]

In the network system, the infrastructure system 3 functions as a cloud computer or the like that controls the plurality of network devices 6. The infrastructure system 3 acquires sense data from one or more network devices 6 mounted with a sensor or the like, provides an interface for presenting information to a user, a monitoring person or the like via the terminal 4, and/or conducts information processing by conducting a control operation based on the sense data and controlling the network device 6 mounted with an actuator or the like. Further, the infrastructure system 3 provides an application environment in which created is an application for a user or the like to process the data from the network device 6 or the data to be transmitted to the network device 6 via the terminal 4. The infrastructure system 3 may be a cloud computing system or the like or may be a server computing system realized by one or more server computers or the like.

[1-4. Terminal 4]

The terminal 4 is a terminal used by a user of a network system in which a plurality of network devices 6 is connected. The terminal 4 may be a computer such as a PC (personal computer), a tablet computer, a smartphone, a workstation, a server computer, or a general-purpose computer or may be a computer system in which a plurality of computers is connected. The terminal 4 is connected to the infrastructure system 3 via the network 2 and is used to use the service provided by the infrastructure system 3.

[1-5. Gateway 5]

The gateway 5 conducts protocol conversion and connects a plurality of network devices 6 to the network 2. The system 1 does not need to include the gateway 5.

[1-6. Network Device 6]

The network device 6 is a device such as a sensor connected to the network 2 and includes an application module 60 and an interface module 61.

The application module 60 and the interface module 61 are detachably connected through a communication connector 600 of the application module 60 and a communication connector 610 of the interface module 61. The communication protocol between the communication connectors 600 and 610 may be the protocol of the serial communication and as one example, the AT command or the like may be communicated using UART (Universal Asynchronous receiver Transmitter).

[1-6-1. Application Module 60]

The application module 60 is one example of equipment and includes at least one of a sensor, an actuator, an input port, an output port, an input/output port and a user interface. The sensor may be a sensor that measures a physical quantity such as, for example, a temperature sensor, a humidity sensor, a flow velocity sensor, a water level sensor, a pressure sensor, a voltage sensor, and a current sensor. The application module 60 may include two or more sensors. The actuator may be, for example, a fan, a motor or the like. The input port, the output port, and the input/output port may be connected to another equipment, and as one example, may be USB ports. When the application module 60 includes at least one of the input ports, the output port, and the input/output port, the application module 60 may be a relay module. Another equipment connected to the application module 60 may be at least one of an imaging device such as a camera or a video that captures an image of a situation in a facility or an object, reading equipment for reading a barcode or a two-dimensional code (as one example, a QR code (registered trademark)) attached to equipment or the like, audio equipment such as a microphone or a speaker that collects abnormal noises and the like in the facility and emits alarm sounds and the like, and position detection equipment that outputs position information of equipment. The user interface may be a remote controller, a lamp, a display device or the like. Note that the application module 60 may further include at least one of a clock unit having a clock function, a user interface unit for input and output, and a power supply unit that supplies power to each functional unit.

[1-6-2. Interface Module 61]

The interface module 61 causes the application module 60 connected thereto to be connected to the network. The interface module 61 may be connectable one at a time to each of the plurality of types of application modules 60. The interface module 61 is one example of the apparatus and includes a power supply unit 611, the communication unit 612, the storage unit 613, the network interface 614, the switching unit 615, the identification information output unit 616, the state information output unit 617, and the switch 618.

[1-6-2(1). Power Supply Unit 611]

The power supply unit 611 supplies electrical power to the interface module 61. The power supply unit 611 may include a battery. The power supply unit 611 may also supply electrical power to the application module 60 via the communication connectors 600 and 610.

[1-6-2(2). Communication Unit 612]

The communication unit 612 is communicably connected to the application module 60 and conducts the communication compatible with the function of the application module 60. For example, when connected to the application module 60, which is a sensor module, the communication unit 612 receives a signal from the sensor and converts the signal into the sense data. As one example, the communication unit 612 converts an analog signal input from the sensor into a digital signal to obtain the sense data. Further, when the communication unit 612 is connected to the application module 60, which is an actuator module, the communication unit 612 transmits a control signal for driving the actuator. The control signal may be supplied from the infrastructure system 3 or the like via the network interface 614. Furthermore, when the communication unit 612 is connected to the application module 60, which is the relay module, the communication unit 612 conducts at least one of the transmission/reception to/from the application module 60.

[1-6-2(3). Storage Unit 613]

The storage unit 613 stores the data received by the communication unit 612 (as one example, the sense data from the application module 60, which is the sensor module) or the data to be transmitted by the communication unit 612 (as one example, control data for the application module 60, which is the actuator module). For example, the storage unit 613 may buffer the sense data received from the application module 60, which is the sensor module.

Further, the storage unit 613 stores the state information of a plurality of types of states. Each of the plurality of types of states may be at least one of the state of the interface module 61 or the state of the application module 60. As one example, the plurality of types of states may include the power on/off state of at least one of the interface module 61 and the application module 60. Each state may be detected by unillustrated state detection means and stored in the storage unit 613.

[1-6-2(4). Network Interface 614]

The network interface 614 is connected to the network 2, accesses the storage unit 613 in response to a request or the like received via the network 2, and provides the information in the storage unit 613 to the requester. Further, the network interface 614 writes various pieces of data to the storage unit 613.

[1-6-2(5). Switching Unit 615]

The switching unit 615 switches a to-be-output state among the plurality of types of states in response to that the switch 618 receiving a switching operation by a user. For example, each time the switching operation is conducted, the switching unit 615 may sequentially select any one of the plurality of types of states as a to-be-output state.

[1-6-2(6). Identification Information Output Unit 616]

The identification information output unit 616 outputs a first indication for identifying a type of a to-be-output state. The indication is used for instruction, display, and implication, and may be for example, a code, a signal, a sound, or a vibration. As one example, the indication may be a single letter such as a number or alphabetical letter. The identification information output unit 616 may include a single first light source 6160 and a first control unit 6161 that causes the first light source 6160 to emit the light in a time series pattern corresponding to the first indication. As one example, the first light source 6160 may be an LED or may emit red light.

[1-6-2(7). State Information Output Unit 617]

The state information output unit 617 outputs the state information on a to-be-output state. The state information output unit 617 may output a second indication according to the state information on a to-be-output state. The state information output unit 617 may include a single second light source 6170 and a second control unit 6171 that causes the second light source 6170 to emit light in a time series pattern corresponding to the second indication. The second light source 6170 may be, as one example, an LED, and may emit the light of a different color than the first light source 6160, for example, may emit the green light.

[1-6-2(8). Switch 618]

The switch 618 receives the operation by a user. The switch 618 may be a single switch. The switch 618 switches on or off a power supply from the power supply unit 611 in response to receiving the operation that continues for the reference duration (also referred to as second reference duration) or more. Further, the switch 618 causes the switching unit 615 to switch a to-be-output state in response to receiving the switching operation of less than the second reference duration. As one example, the second reference duration may be two seconds or the like.

The state of the switch 618 may be switched between at least two states (as one example, the ON state (closed state) and the OFF state (opened state)) by the user operation. The switch 618 may be a mechanical switch in which the state is switched by a mechanical operation such as pressing or sliding (as one example, a push button, a slide switch, a toggle switch, tension switch or the like), an optical switch having a photodiode or the like in which the state is switched by receiving light, the magnetic switch in which the state is switched by a magnetic proximity having a hall element, magneto resistive element, a reed switch or the like, the electrical switch in which the state is switched by receiving an electrical signal having a transistor or the like, a capacitance switch in which the state is switched by contacting the human body (as one example, finger portion), a vibration switch in which a state is switched by vibration, a sound switch in which the state is switched by the air vibration (sound) including a microphone, and an inclination sensor in which a state is switched by the change in the inclination. When the switch 618 is a tension switch, even if the network device 6 is installed at a difficult-to-reach location such as a high place, the switch 618 may be operated easily by using operating means such as a long string and the switch in combination. Similarly, when the switch 618 is an optical switch, even if the network device 6 is installed at a difficult-to-reach location, the switch 618 may be operated easily. When the switch 618 is a magnetic switch, since a magnet (as one example, an electromagnet) becomes necessary for the operation, it is possible to prevent an unauthorized person from conducting the operation without permission. Further, when the switch 618 is an electrical switch, the switch 618 may be operated via, for example, the infrastructure system 3 and the terminal 4. When the switch 618 is a capacitance switch, the operation contents may differ depending on the pattern of the touch operation by the operator (as one example, tap, double tap, long tap, flick, drag, multi tap, pinch and the like). When the switch 618 is a vibration sensor, the operation may be conducted by the operator vibrating (as one example tapping) the network device 6 and the operation contents may differ depending on the vibration pattern (for example, the operation may be conducted only with the specific pattern). When the switch 618 is a vibration sensor, even if the network device 6 is installed at a difficult-to-reach location, the operation may be conducted easily by using operating means such as a long rod and the switch in combination. When the switch 618 is a sound switch, voice recognition is conducted, and operation contents may differ depending on the voice contents or operation contents may differ depending on the frequency or the generation pattern of specific sound (for example, the operation may be conducted only with a specific voice print and the generation pattern of a specific sound). When the switch 618 is a sound switch, even if the network device 6 is installed in the difficult-to-reach location, the operation can be conducted easily.

According to the above system 1, the state information on a to-be-output state and the first indication for identifying a type of a to-be-output state are output. Therefore, even if the output capability of the interface module 61 is low, it is possible to check the state information of each of a plurality of states at the site. Accordingly, unlike when a display having high display capability is mounted to the interface module 61 to facilitate checking of a type of a to-be-output state, it is possible to prevent the increase in the size of the interface module 61, and the manufacturing cost and the power consumption can be reduced. Further, since the state may be checked without connecting the terminal such as personal computer to the interface module 61, the checking can be facilitated.

Further, since the identification information output unit 616 and the state information output unit 617 respectively include a single first light source 6160 and a single second light source 6170, it is possible to further reduce the size of the interface module 61, the manufacturing cost and the power consumption as compared to the case of having a plurality of light sources (for example, the light sources of a seven-segment display). Further, since the light is generated in the pattern corresponding to the first indication, a type of a to-be-output state may be certainly checked. Similarly, since the light is generated in the pattern corresponding to the second indication, the state information on a to-be-output state can be certainly checked.

Further, since each of a plurality of types of states is at least one of the state of the interface module 61 or the state of the application module 60, it is possible to check the state information on at least one of the states.

Further, since the switch 618 switches on or off a power supply from the power supply unit 611 in response to receiving an operation that continues for the second reference duration or more and switches a to-be-output state in response to receiving a switching operation that continues for a duration less than the second reference duration, two kinds of switching can be conducted using a single switch 618. Accordingly, compared to when two switches are provided, the size of the interface module 61 can be reduced.

2. Network Device 6

Figure 2:
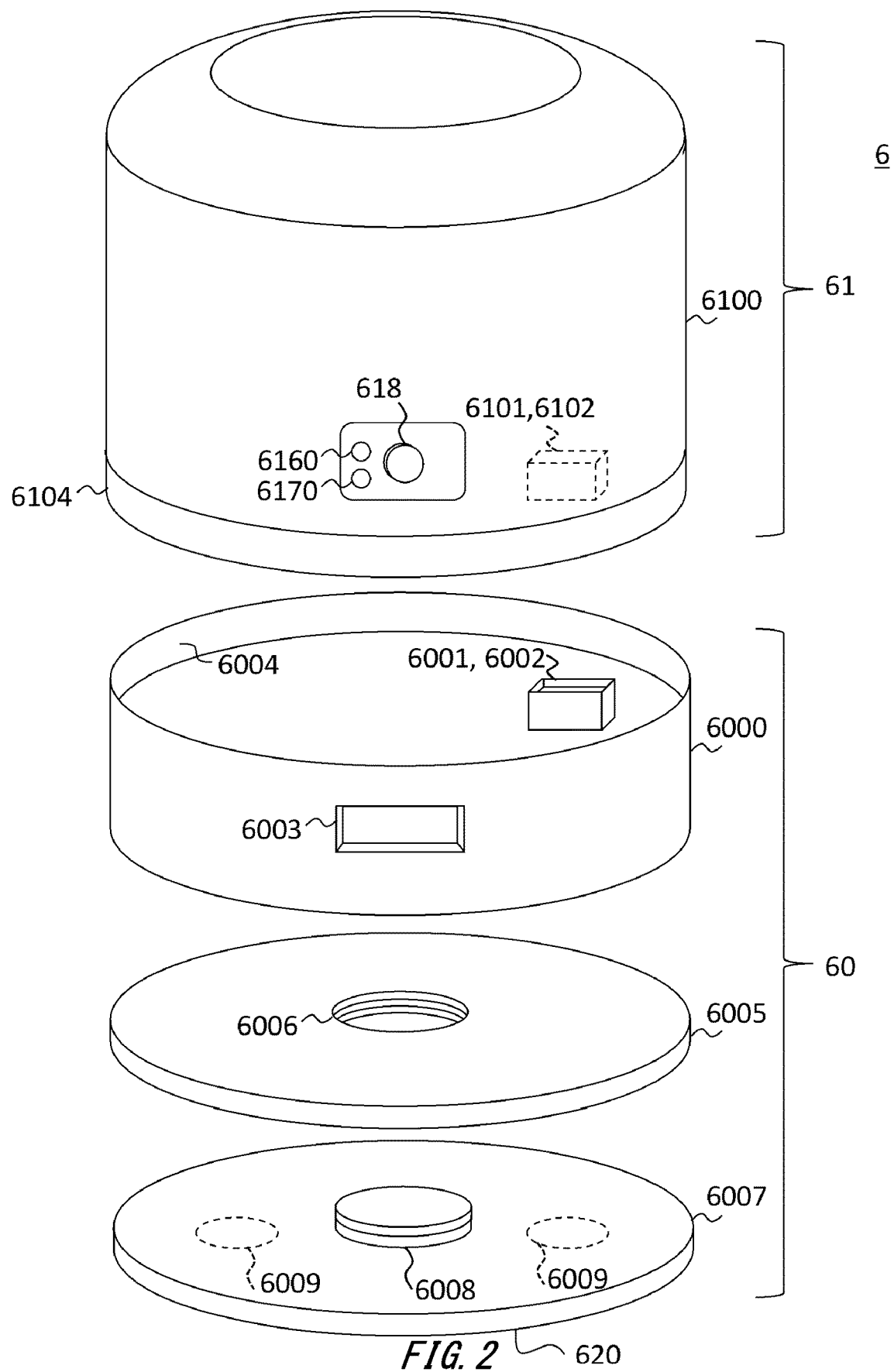
FIG. 2 is an exploded perspective view illustrating a network device 6 according to the present embodiment.

FIG. 2 is an exploded perspective view illustrating the network device 6 according to the present embodiment. The interface module 61 of the network device 6 includes a case 6100 for accommodating each functional unit inside and the application module 60 includes a case 6000 for accommodating each functional unit inside, the seating 6005, and the mounting tap 6007. However, the application module 60 does not necessarily include a seating 6005 and a mounting tap 6007.

The cases 6000 and 6100 are detachably connected and include communication connectors 6001 and 6101 that enable the wired communication. Further, the cases 6000 and 6100 are detachably connected and include power connectors 6002 and 6102 that enable the power supply between the application module 60 and the interface module 61. The power supply via the power connectors 6002 and 6102 may be conducted in either direction between the application module 60 and the interface module 61. Note that, in the present embodiment, as one example, in the drawing, the communication connector 6001 and the power connector 6002 are illustrated as the same connector and the communication connector 6101 and the power connector 6102 are illustrated as the same connector, but the connectors may be separate connectors.

The cases 6000 and 6100 mate with each other so as to connect the application module 60 and the interface module 61. As one example, in the present embodiment, a protrusion 6104 at the end of the case 6100 (the lower end in the drawing) mates with an opening 6004 at the end (the upper end in the drawing) of the case 6000. A screw thread and a thread groove may be provided to the inner surface of the opening 6004 and the outer surface of the protrusion 6104 respectively. In addition to or instead of this, a packing may be provided to the opening 6004 and the protrusion 6104. As one example, in the present embodiment, connecting the application module 60 and the interface module 61 means the electrical connection between them. For example, the communication connectors 6001 and 6101 and the power connectors 6002 and 6102 may be provided to the connection surfaces of the cases 6000 and 6100 respectively, and in response to that the cases 6000 and 6100 being mated with each other, the communication connectors 6001 and 6101 may be electrically connected with each other and the power connectors 6002 and 6102 may be electrically connected with each other. In addition to or instead of this, connecting the application module 60 and the interface module 61 may mean physically connecting them. In this case, as one example, users of the application module 60 and the interface module 61 electrically connect the connectors to each other and then mate the cases 6000 and 6100 with each other so that the application module 60 and the interface module 61 are physically connected.

The shape of the outer circumference of the connection surface between the cases 6000 and 6100 may be identical. For example, in FIG. 2, the cases 6000 and 6100 are respectively cylindrical, and the outer circumference shape of the connection surface is circular respectively. Note that, a feature that the shape of the outer circumference is identical corresponds to the feature that the shape of the outer circumference is substantially identical or may include a feature that, for example, the shape is different in at least a part of the outer circumference.

The first light source 6160 and the second light source 6170 are provided to the case 6100 of the interface module 61 and the switch 618 is provided as the push button. As one example, in the present drawing, although the first light source 6160 and the first light source 6160 are provided to the outer surface of the case 6100, as long as the case 6100 has the translucency, the light sources may be provide inside the case 6100.

Provided to the case 6000 of the application module 60 is the input/output connector 6003 for communicating directly with the application module 60 without intervention of the interface module 61. As one example, the input/output connector 6003 may be the USB port. The input/output connector 6003 may function as a power supply connector for receiving the power supply from the outside. The input/output connector 6003 may be provided to the case 6100 in addition to or instead of the case 6000.

The seating 6005 is fixed to a surface of the case 6000 in the application module 60, which surface is opposite from the case 6100 side (lower surface in the drawing). The seating 6005 is a member for fixing the mounting tap 6007 to the case 6000, and as one example, has the screw hole 6006 at the middle section. Note that, the seating 6005 may be integrally provided with the case 6000.

The mounting tap 6007 includes a columnar screw part 6008 at the middle section and is fixed to the case 6000 by screwing the screw part 6008 to the screw hole 6006 of the seating 6005. The mounting tap 6007 is a member for mounting and installing the case 6000 and hence the network device 6 and has the mounting surface 620 on the surface opposite to the seating 6005 (the lower surface in the drawing). The magnet 6009 for mounting the case 6000 to the installation place is provided to the mounting surface 620. Alternatively, to the mounting surface 620, the screw hole through which the screw for mounting and installing the case 6000 is inserted may be provided or the double-sided tape may be attached.

3. Outputs of First Indication and Second Indication

FIG. 3 illustrates output patterns of the first indication and the second indication.

In the drawing, a column of sign "#" indicates the identification number of the outputtable state. The state of the "power source" corresponding to the identification number "0" is a state concerning whether the power source of the interface module 61 (or the application module 60) is turned on or turned off. The state of the "battery voltage" corresponding to the identification number "1" is a state concerning whether the supply voltage by the power supply unit 611 is high or low. The state of the "USB powered" corresponding to the identification number "2" is the state concerning whether the power feeding using the input/output connector (as one example, USB connector) 6003 is on or off. The state of the "operation state" corresponding to the identification number "3" is the state concerning whether the operation of the interface module 61 (or the application module 60) is normal or abnormal. The state of the "communication state" corresponding to the identification number "4" is a state concerning to which node, the communication by the network interface 614 is normal. With respect to the state of "preliminary" corresponding to identification numbers "5" to "7," the allocation is not conducted at this stage and the allocation is possible to any state of either one of the interface module 61 and the application module 60.

The identification information output unit 616 and the state information output unit 617 may cause the first light source 6160 and the second light source 6170 to operate in the time series pattern illustrated in FIG. 3 based on a type of a to-be-output state and the state information. As one example, in the present embodiment, the first light source 6160 and the second light source 6170 are continuously light a lamp or put the light out for the unit time (as one example, for 200 ms) as one operation. Each of circle symbols arrayed in each column indicates contents of one operation by the first light source 6160 or the second light source 6170 and the white circle indicates putting the light out and the black circle indicates lighting of a lamp.

The circle symbol indicates the later operation (new operation) as it goes to the right side.

The identification information output unit 616 repeatedly conduct the operations of lighting of a lamp and putting the light out alternately the first light source 6160 by the number of times of the identification number of the to-be-output state and the operation of a plurality of times (in the present embodiment, as one example, two times). Thereby, the first indication is output and a type of a to-be-output state can be identified.

When the to-be-output state is the state of the "power source," the state information output unit 617 maintains lighting of a lamp when the power source is turned on and maintains putting the light out when the power source is turned off. When the to-be-output state is the state of the battery voltage, the state information output unit 617 maintains lighting of a lamp if the supply voltage is higher than the reference voltage and maintains putting the light out if the supply voltage is lower than the reference voltage. When the to-be-output state is the state of the "USB powered," the state information output unit 617 maintains lighting of a lamp if the power feeding is on and maintains putting the light out if the power feeding is off. When the to-be-output state is the state of the "operation state", the state information output unit 617 maintains lighting of a lamp if the operation is normal and maintains putting the light out if the operation if abnormal. When the to-be-output state is the state of the "communication state," the state information output unit 617 maintains lighting of a lamp if the communicate by the network interface 614 to the infrastructure system 3 is normal, alternately conducts lighting of a lamp for a plurality of times (as one example three times) and putting the light out for a plurality of times (as one example, two times) if the communication to the gateway 5 is normal, maintains putting the light out when the communication is abnormal, and alternately conducts lighting of a lamp and putting the light out if the network interface 614 makes an inquiry to each node. When the to-be-output state is the "preliminary" state, i.e., when the allocation is not conducted, the state information output unit 617 maintains lighting of a lamp and putting the light out. By the above, the second indication according to the state information on a to-be-output state is output and the to-be-output state becomes checkable.

4. Operation of Interface Module 61

Figure 4:
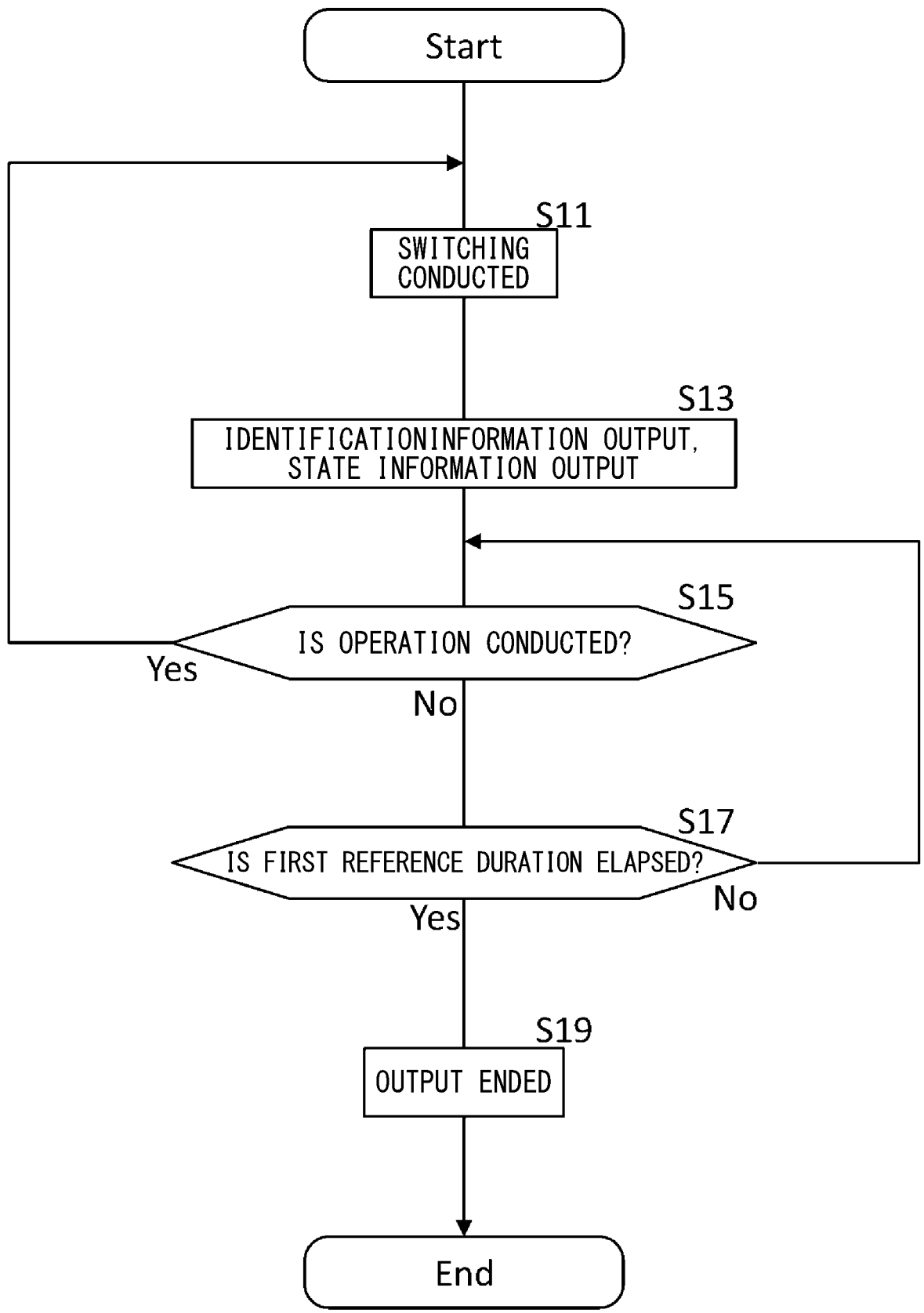
FIG. 4 illustrates operations of an interface module 61.

FIG. 4 illustrates the operation of the interface module 61. The interface module 61 conducts processes of steps S11 to S19 to output a plurality of states in the checkable manner.

At step S11, the switching unit 615 switches a to-be-output state from among a plurality of types of states in response to the fact that the switch 618 receives the switching operation. As one example, in the present embodiment, when the click operation of less than the second reference duration is conducted once to the switch 618 as the push button, the switching unit 615 sets the state corresponding to the identification number "0" to the output target, when the click operation is conducted twice to the switch, sets the state corresponding to the identification number "1" to the output target, and thereafter, in the same manner, each time the click operations conducted, the identification number may be incremented and the output target may be updated.

When the incremented identification number exceeds the maximum value (seven in the present embodiment), the switching unit 615 may return the identification number to "0" and update the output target. When the click operation of less than the second reference duration is continuously conducted to the switch 618 at an interval of less than the third reference duration (as one example, one second), i.e., when the double click operation is conducted, the switching unit 615 may decrement the identification number of the to-be-output state or may reset the identification number to "0."

At step S13, the identification information output unit 616 outputs the first indication according to a type of a to-be-output state and the state information output unit 617 outputs the second indication according to the state information on a to-be-output state. Note that, as one example, in the present embodiment, although it is explained that, in response to a fact that a type of a to-be-output state is switched, the state detection means acquires the state information and stores the information in the storage unit 613, the state information may be periodically acquired and stored in advance in the storage unit 613. Further, when a type of a to-be-output state and the state information are output as the indication, the network interface 614 may transmit a type of a to-be-output state and the state information to the infrastructure system 3 and the terminal 4. In this case, the network interface 614 may also transmit the time when the switch 618 is operated. Thereby, the infrastructure system 3 and the terminal 4 can check the history of the state information and the operation history of the state confirmation. When the sense data is periodically transmitted to the infrastructure system 3 or the terminal 4, the network interface 614 may temporarily store a type of a to-be-output state and the state information in the storage unit 613 and may transmit the information together at the time of the transmission of the sense data.

At step S15, the switching unit 615 determines whether the switch 618 receives the switching operation. When at step S15, it is determined that the switching operation is conducted (step S15; Yes), the process of the switching unit 615 proceeds to above-mentioned step S11. In this case, the identification information output unit 616 and the state information output unit 617 may stop the output of the indication. When at step S15, it is determined that the switching operation is not conducted (step S15; No), the process of the switching unit 615 proceeds to step S17. Note that, when the to-be-output state is in the "communication state" (please refer to FIG. 3) and as the state information, when the second indication indicating that the network interface 614 is in the middle of inquiry (second light source 6170 alternately conducts lighting of a lamp and putting the light out) is output, from when the inquiry by the switching unit 615 is completed to when the second indication indicating the state information of the communication state is output, the switching operation by the switch 618 may be invalidated. Thereby, when the answer to the inquiry is transmitted from the infrastructure system 3 and the terminal 4, since the answer can be certainly received, it is possible to prevent an error in which the interface module 61 does not receive the answer.

At step S17, the switching unit 615 determines whether the reference duration (first reference duration) has elapsed. As one example, the first reference duration may be 10 seconds. When at step S17, it is determined that the first reference duration has not elapsed (step S17; No), the process of the switching unit 615 proceeds to the above-mentioned step S15. When at step S17, it is determined that the first reference duration has elapsed (step S17; Yes), the process of the switching unit 615 proceeds to step S19.

At step S19, the identification information output unit 616 and the state information output unit 617 end an output of the indication. Thereby, since the output ends by not receiving the operation by a user during the first reference duration, the energy consumption can be reduced. Further, the to-be-output state can be reset and selected again.

Note that, the above operations may be conducted for the state confirmation when the network device 6 or the application module 60 is installed or maintained, and after checking each state, the switching unit 615, the identification information output unit 616, and the state information output unit 617 may be disabled through the operation of the switch 618 or the operation from the terminal 4 or the infrastructure system 3 via the network interface 614. When the switch 618 receives the click operation after the units are disabled, the first light source 6160 of the identification information output unit 616 may notify an operator that the switching unit 615 and the like are disabled by continuously lighting a lamp for a predetermined time (as one example, five seconds).

5. Modified Example

Note that, although in the above-mentioned embodiment, it is described that the interface module 61 includes the power supply unit 611, the communication unit 612, the network interface 614, and the switch 618, the interface module 61 may not include at least one of the above. For example, when the interface module 61 does not include the power supply unit 611, the interface module 61 may receive the power from the application module 60 or may receive the power from the outside of the network device 6. When the interface module 61 does not include the switch 618, the switching unit 615 may switch a to-be-output state every unit time (as one example, 10 seconds).

Further, although it has been described that the identification information output unit 616 includes one first light source 6160 and the state information output unit 617 includes one second light source 6170, at least one of the identification information output unit 616 and the state information output unit 617 may include a plurality of light sources. When the identification information output unit 616 includes a plurality of first light sources 6160, the first control unit 6161 may cause the first light source 6160 in the arrangement pattern corresponding to the first indication to emit the light from among a plurality of first light sources 6160. As one example, the identification information output unit 616 may include three first light sources 6160 arranged side by side and the first control unit 6161 may cause the first light source 6160 to emit the light such that, as the first indication for identifying a type of a to-be-output state, any number from 0 to 7 is output as a binary number. Similarly, when the state information output unit 617 includes a plurality of second light sources 6170, from among a plurality of second light sources 6170, the second control unit 6171 may cause the second light source 6170 in the arrangement pattern corresponding to the second indication of the state information to emit the light or cause the second light source 6170 in the arrangement pattern of the character string or the numerical value corresponding to the state information itself to emit the light.

Figure 5:
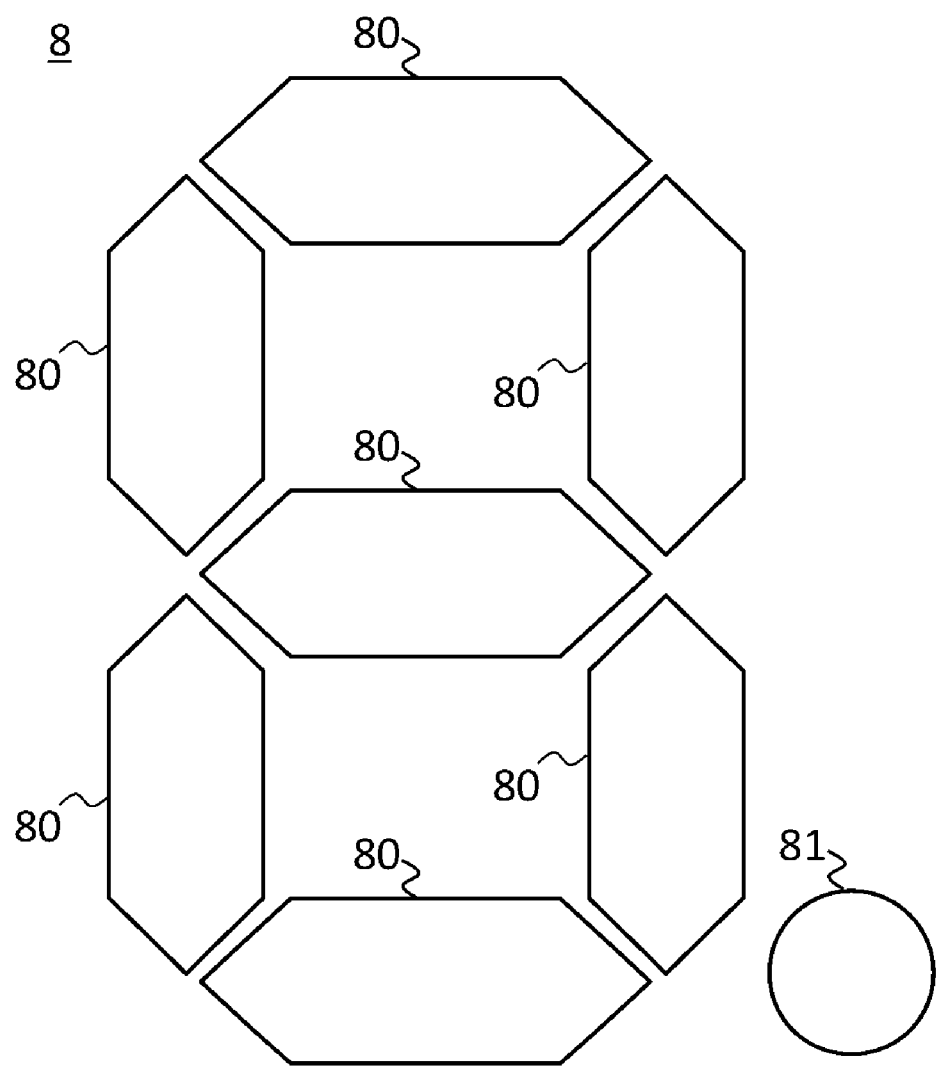
FIG. 5 illustrates a seven-segment display 8.
Figure 6:
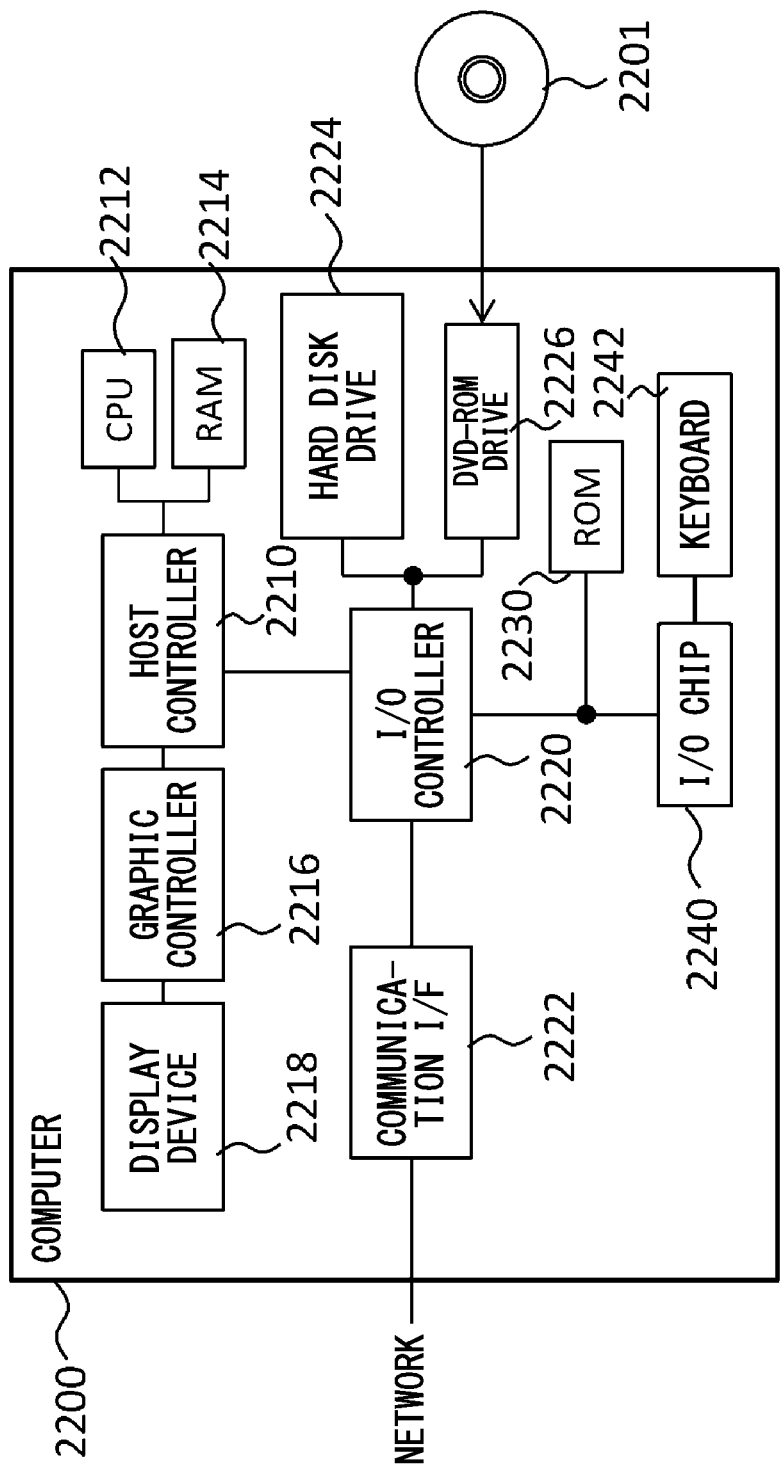
FIG. 6 illustrates an example of a computer 2200 in which a plurality of aspects of the present invention may be entirely or partially embodied.

Further, the identification information output unit 616 may include a part of the light source in a single seven-segment display as the first light source 6160, and the state information output unit 617 may include another part of the light source as the second light source 6170. FIG. 5 illustrates the seven-segment display 8. The seven-segment display 8 includes seven light sources 80 for displaying numbers and one light source 81 for displaying decimal point. Seven light sources 80 may be the first light source 6160, and as the first indication for identifying the to-be-output state, the identification number of the to-be-output state may be displayed. One light source 81 may be the second light source 6170, and as similar to the above-mentioned embodiment, the second indication according to the state information on a to-be-output state may be displayed in the time series pattern. Thereby, since by use of a single seven-segment display 8, a type of a to-be-output state and the state information can be checked, as compared to the case where a plurality of seven-segment displays 8 are used or the case where the dot matrix display is used, it is possible to reduce the size of the interface module 61, the manufacturing cost, and the power consumption.

Further, although it has been described that the identification information output unit 616 and the state information output unit 617 include the first light source 6160 and the second light source 6170, at least one of the identification information output unit 616 and the state information output unit 617 may include the generation source that generates the sound or the vibration in addition to or instead of the light source. When each of the identification information output unit 616 and the state information output unit 617 includes the generation source of the sound or include the generation source of the vibration, these generation sources may generate the sound or the vibration having the different wavelength. As similar to the above-mentioned embodiment, these generation sources may be controlled to generate the sound or the vibration in the time series pattern corresponding to the indication. If the indication is generated by the sound or the vibration, a blind user can check the state. When the network device 6 is installed in the dark room in which the light is blocked, the state can be checked without generating the light. When the state information output unit 617 includes the generation source that generates the sound, the state information output unit 617 may output the state information itself as the voice.

Further, although it has been described that the identification information output unit 616 and the state information output unit 617 generate the light, the sound, or the vibration having the different wavelength, as long as the first indication and the second indication (or state information itself) are output in the distinguishable manner, the identification information output unit 616 and the state information output unit 617 may generate the light, the sound, or the vibration having the same wavelength. As one example, the generation source of the identification information output unit 616 and the generation source of the state information output unit 617 may operate so that the durations of the operations differ from each other or may be arranged to be spaced apart from each other.

Although it has been described that the identification information output unit 616 and the state information output unit 617 generate the light, the sound, or the vibration in the time series pattern corresponding to the indication, at least one of the identification information output unit 616 and the state information output unit 617 may generate the light, the sound, or the vibration at the frequency corresponding to the indication. As one example, the identification information output unit 616 may generate the light of the color corresponding to a type of a to-be-output state.

Although it has been described that the identification information output unit 616 and the state information output unit 617 generate the light, the sound or the vibration corresponding to the indication, at least one of the identification information output unit 616 and the state information output unit 617 may include the pin appearance device that outputs the indication by only the pin arranged to correspond to the indication protruding among a plurality of pins that may appear and is arranged side by side.

In this case, the blind user can check the state. Further, when the network device 6 is installed in the dark room in which the light is blocked, the state can be checked without generating the light. When the state information output unit 617 includes the pin appearance device, the state information output unit 617 may cause the pin arranged to correspond to the braille pattern of the state information to protrude and output the state information itself. When at least one of the identification information output unit 616 and the state information output unit 617 includes any one or more of the light source, the sound generation source, the vibration generation source, and the pin appearance device as the output source of the indication (or state information itself), at least one of the identification information output unit 616 and the state information output unit 617 may switch the output source in response to the operation by the operator. The switching operation may be conducted by the voice, and in this case, as one example, the output may be conducted by the output source according to the contents of the voice that is recognized through the voice recognition or the output may be conducted by the output source that is pre-registered in association with the voice print of the voice. Further, the switching operation may be conducted by the touch operation of the operator. In this case, the output may be conducted by the output source that is pre-registered in association with the fingerprint recognized by the touch operation.

Further, although it has been described that the identification information output unit 616 and the state information output unit 617 include a separate output source (as one example, first light source 6160 and second light source 6170) that outputs the indication (or the state information itself), the output units may include the common output source. When the identification information output unit 616 and the state information output unit 617 include the common output source, the output may be conducted in different output periods from each other to output the first indication and the second indication (or state information itself) in the distinguishable manner. In addition to this, the output source may differentiate the output intensity (as one example, luminance, volume, displacement of vibration, and displacement of pin) depending on when the first indication is output and when the second indication (or state information itself) is output.

Further, although it has been described that the switching unit 615 decrements or resets to "0" the identification number of the to-be-output state when the switch 618 receives the double click operation, the switching unit 615 may conduct other processes. For example, a plurality of states that can be output may be divided into the state group of the interface module 61 and the state group of the application module 60, and the switching unit 615 may switch the state group for which the to-be-output state is selected in response to the double click operation. When nine or more states that can be output are present, the states can be divided into maximally eight state groups and the switching unit 615 may switch the state group for which the to-be-output state is selected according to the double click operation. In these cases, the first light source 6160 and the second light source 6170 may change the unit time of the operation according to the state group for which the to-be-output state is selected.

Further, although it has been described that the switching unit 615 conducts the processes when the switch 618 receives the double click operation, from among respective configurations of the interface module 61, another configuration different from that of the switching unit 615 may conduct the processes. For example, when the double click operation is conducted, the storage unit 613 may initialize internal setting data, the storage unit 613 may store the current time, the network interface 614 may transmit the current time to the infrastructure system 3, the network interface 614 may read the sense data from the storage unit 613 and transmit the sense data to the infrastructure system 3, the network interface 614 may download the firmware, or the power supply unit 611 may conduct switching to turn on or off the power feeding to the application module 60. When the current time is stored in the storage unit 613 in response to the double click operation or the current time is transmitted to the infrastructure system 3, the operation history of the state confirmation of the interface module 61 can be checked.

Further, although it has been described that the switching unit 615 conducts separate processes depending on when the switch 618 receives the click operation and when the switch 618 receives the double click operation, when the triple click operation is conducted, the switching unit 615 may conduct the further separate process.

Further, although it has been described that the apparatus is the interface module 61, the apparatus may be the network device 6 in which the interface module 61 and the application module 60 are integrated or the apparatus may be the local device that is not connected to the network 2 (as one example, home appliance such as washing machine or rice cooker).

Further, although it has been described that the storage unit 613 stores the sense data and the control data in addition to the state information, the storage unit 613 does not necessarily need to store the sense data and the control data.

Various embodiments of the present invention may be described with reference to flowcharts and block diagrams whose blocks may represent (1) stages of processes in which operations are performed or (2) sections of apparatuses responsible for performing operations. The specific stage and section may be implemented by at least one of the dedicated circuit, the programmable circuit that is supplied together with the computer-readable instruction stored on the computer readable medium, and the processor supplied together with the computer-readable instruction stored on the computer readable medium. The dedicated circuit may include either one of the digital hardware circuit and the analog hardware circuit, and may include at least one of the integrated circuit (IC) and the discrete circuit Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

FIG. 16 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads the program and the data from the IC card and, in addition or instead of this, writes the program and the data to the IC card.

The ROM 2230 stores therein either one of the boot program executed by the computer 2200 upon activation and the program dependent on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc. and may conduct various types of processes on the data of the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, specification, or diagrams can be performed in any order as long as the order is not indicated by "prior to," "before," or the like and as long as the output from a previous process is not used in a later process. Even if the process flow is described using phrases such as "first" or "next" in the claims, specification, or diagrams, it does not necessarily mean that the process must be performed in this order.

EXPLANATION OF REFERENCES

1. System, 2. Network, 3. Infrastructure system, 4. Terminal, 5. Gateway, 6. Network device, 8. Seven-segment display, 60. Application module, 61. Interface module, 600. Communication connector, 610. Communication connector, 611. Power supply unit, 612. Communication unit, 613. Storage unit, 614. Network interface, 615. Switching unit, 616. Identification information output unit, 617. State information output unit, 618. Switch, 620. Mounting surface, 6160. First light source, 6161. First control unit, 6170. Second light source, 6171. Second control unit, 80. Light source, 81. Light source, 2200. Computer, 2201. DVD-ROM, 2210. Host controller, 2212. CPU, 2214. RAM, 2216. Graphic controller, 2218. Display device, 2220. Input/output controller, 2222. Communication interface, 2224. Hard disk drive, 2226. DVD-ROM drive, 2230. ROM, 2240. Input/output chip, 2242. Keyboard, 6000. Case, 6001. Communication connector, 6002. Power connector, 6003. Input/output connector, 6004. Opening, 6005. Seating, 6006. Screw hole, 6007. Mounting tap, 6008. Screw part, 6009. Magnet, 6100. Case, 6101. Communication connector, 6102. Power connector, 6104. Protrusion

What is claimed is:

1. An apparatus for use by a user, the apparatus comprising:
    a memory configured to:
        store pieces of state information that are each associated with one of a plurality of types of states, each of the plurality of types of states corresponding to one of a plurality of states, each of the plurality of states being at least one of a state of the apparatus or a state of an equipment connected to the apparatus,
        store a unique pattern or sequence that is associated with a corresponding one of the plurality of types of states for each of the plurality of types of states, and
        store a current time in response to a double click operation of a single switch being performed by the user;
a network interface connected to a network;
the single switch being configured to detect a switching operation by the user;
a processor programmed to:
determine whether the switching operation is equal or greater than a second reference duration, in response to the switching operation being less than the second reference duration, switch a to-be-output state to one corresponding to an updated target from among the plurality of types of states and sets an identification number of the to-be-output state,
in response to the switching operation being equal or greater than the second reference duration, switch on or off a power supply, output a first indication including the unique pattern or sequence that identifies a type of the to-be-output state from among the plurality of types of states, output state information indicating the to-be-output state of the apparatus or of the equipment connected to the apparatus, and output the current time via the network interface together with the output of the first indication and the output of the state information; and
a generation source configured to:
exhibit the first indication including the unique pattern or sequence that identifies the type of the to-be-output state corresponding to the updated target to the user, wherein a first control unit of the generation source repeatedly conducts operations of a first light source of a single first generation source on and off corresponding to the unique pattern or sequence of the first indication, wherein each unique pattern or sequence associated with the type of the to-be-output state corresponds to a predetermined number of the operations, wherein each operation of the operations corresponds to a predetermined time unit; and
exhibit the state information indicating the to-be-output state corresponding to the updated target to the user, in response to the to-be-output state being switched to one corresponding to the updated target.

2. The apparatus according to claim 1, wherein the processor includes: at least one second generation source that generates light, sound or vibration; and a second control unit that operates the second generation source in a pattern corresponding to a second indication according to the state information on the to-be-output state.

3. The apparatus according to claim 2, wherein
the at least one second generation source is seven light sources for displaying a number in a seven-segment display; and the at least one first generation source is a light source for displaying a decimal point in the seven-segment display.

4. The apparatus according to claim 2, wherein
the processor includes a single second generation source;
the second control unit operates the second generation source in a time series pattern corresponding to the second indication.

5. The apparatus according to claim 4, wherein the first generation source and the second generation source are a same generation source; and the first control unit and the second control unit operate the same generation source in different output periods from each other.

6. The apparatus according to claim 2, wherein
the processor includes the single first generation source;
the processor includes a single second generation source;
the first control unit operates the first generation source at a frequency corresponding to the first indication; and
the second control unit operates the second generation source at a frequency corresponding to the second indication.

7. The apparatus according to claim 1, wherein the processor includes a pin appearance device that has a plurality of arranged pins that can protrude and outputs the first indication by causing only a pin arranged to correspond to the first indication protruding from among the plurality of pins.

8. The apparatus according to claim 1, wherein the processor ends the outputting if an operation by a user is not received during predetermined first reference duration.

9. The apparatus according to claim 1, wherein the single switch is a tension switch, an optical switch whose state is switched when receiving light, a magnetic switch whose state is switched when a magnetic body is in a proximity, a capacitance switch whose state is switched when coming into contact with a human body, a vibration switch whose state is switched by a vibration, or a sound switch whose state is switched by air vibration.

10. The apparatus according to claim 1, wherein the equipment is an application module including at least one of a sensor, an actuator, an input port, an output port, an input/output port, and a user interface, and the apparatus is an interface module including: an interface module side communication connector detachably connected to an application module side communication connector of the application module; and a network interface connected to a network.

11. The apparatus according to claim 10, wherein when the processor conducts an output, the network interface transmits contents of the output.

12. A method for use of an apparatus by a user, the method comprising:
storing, by a processor and in a memory of the apparatus, pieces of state information that are each associated with one of a plurality of types of states and a unique pattern or sequence that is associated with a corresponding one of the plurality of types of states for each of the plurality of types of states, wherein each of the plurality of types of states corresponds to one of a plurality of states, wherein each of the plurality of states is at least one of a state of the apparatus or a state of an equipment connected to the apparatus, wherein a network interface is connected to a network, and wherein the apparatus further stores in the memory a current time in response to a double clock operation of a single switch of the apparatus being performed by the user;
detecting, by the processor, with the single switch a switching operation by a user;
determining, by the processor, whether the switching operation is equal or greater than a second reference duration,
in response to the switching operation being less than the second reference duration, switch a to-be-output state to one corresponding to an updated target from among the plurality of types of states and sets an identification number of the to-be-output state,
in response to the switching operation being equal or greater than the second reference duration, switch on or off a power supply, outputting a first indication including the unique pattern or sequence that identifies a type of the to-be-output state from among the plurality of types of states of the apparatus or of the equipment connected to the apparatus, outputting state information indicating the to-be-output state, and outputting a current time via the network interface together with the output of the first indication and the output of the state information; and exhibiting, by a generation source of the apparatus, the first indication including the unique pattern or sequence that identifies the type of the to-be-output state corresponding to the updated target to the user, wherein a first control unit of the generation source repeatedly conducts operations of a first light source of a single first generation source on and off corresponding to the unique pattern or sequence of the first indication, wherein each unique pattern or sequence associated with the type of the to-be-output state corresponds to a predetermined number of the operations, wherein each operation of the operations corresponds to a predetermined time unit; and exhibiting, by the generation source, the state information indicating the to-be-output state corresponding to the updated target to the user, in response to the to-be-output state being switched to one corresponding to the updated target.

13. A non-transitory recording medium storing a program that causes a computer to function as:

a memory configured to:

store pieces of state information that are each associated with one of a plurality of types of states, each of the plurality of types of states corresponding to one of a plurality of states, each of the plurality of states being at least one of a state of the apparatus or a state of an equipment connected to the apparatus, store a unique pattern or sequence that is associated with a corresponding one of the plurality of types of states for each of the plurality of types of states, and store a current time in response to a double click operation of a single switch being performed by the user;

a network interface connected to a network;

the single switch being configured to detect a switching operation by the user;

a processor programmed to:

determine whether the switching operation is equal or greater than a second reference duration, in response to the switching operation being less than the second reference duration, switch a to-be-output state to one corresponding to an updated target from among the plurality of types of states and sets an identification number of the to-be-output state, in response to the switching operation being equal or greater than the second reference duration, switch on or off a power supply, output a first indication including the unique pattern or sequence that identifies a type of the to-be-output state from among the plurality of types of states, output state information indicating the to-be-output state of the apparatus or of the equipment connected to the apparatus, and output the current time via the network interface together with the output of the first indication and the output of the state information; and a generation source configured to:

exhibit the first indication including the unique pattern or sequence that identifies the type of the to-be-output state corresponding to the updated target to the user, wherein a first control unit of the generation source repeatedly conducts operations of a first light source of a single first generation source on and off corresponding to the unique pattern or sequence of the first indication, wherein each unique pattern or sequence associated with the type of the to-be-output state corresponds to a predetermined number of the operations, wherein each operation of the operations corresponds to a predetermined time unit; and exhibit the state information indicating the to-be-output state corresponding to the updated target to the user, in response to the to-be-output state being switched to one corresponding to the updated target.

* * * * *